United States Patent
Murakami

(10) Patent No.: US 11,341,458 B2
(45) Date of Patent: May 24, 2022

(54) ORDER REGISTRATION DEVICE, ORDER REGISTRATION METHOD, AND RECORDING MEDIUM

(71) Applicant: CASIO COMPUTER CO., LTD., Tokyo (JP)

(72) Inventor: Bungo Murakami, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 205 days.

(21) Appl. No.: 16/715,500

(22) Filed: Dec. 16, 2019

(65) Prior Publication Data
US 2020/0193377 A1 Jun. 18, 2020

(30) Foreign Application Priority Data
Dec. 17, 2018 (JP) .............................. JP2018-235888

(51) Int. Cl.
| | |
|---|---|
| *G06Q 10/08* | (2012.01) |
| *G06F 3/0482* | (2013.01) |
| *G06F 3/04883* | (2022.01) |
| *G07G 1/01* | (2006.01) |
| *G07G 1/12* | (2006.01) |

(52) U.S. Cl.
CPC ....... *G06Q 10/0875* (2013.01); *G06F 3/0482* (2013.01); *G06F 3/04883* (2013.01); *G07G 1/01* (2013.01); *G07G 1/12* (2013.01)

(58) Field of Classification Search
CPC ... G07G 1/01; G07G 1/12; G07G 1/06; G06F 3/0482; G06F 3/04883; G06F 3/0484; G06F 3/0488; G06Q 50/12; G06Q 20/201; G06Q 20/202; G06Q 10/0875; G06Q 10/08

USPC .......................................................... 705/29
See application file for complete search history.

(56) References Cited

U.S. PATENT DOCUMENTS

| | | | | |
|---|---|---|---|---|
| 10,929,906 B2* | 2/2021 | Dalglish | ................ | G06Q 50/01 |
| 2013/0090959 A1* | 4/2013 | Kvamme | ............... | G06Q 10/02 |
| | | | | 705/5 |

(Continued)

FOREIGN PATENT DOCUMENTS

| | | |
|---|---|---|
| JP | 2004-302887 A | 10/2004 |
| JP | 2011-065456 A | 3/2011 |

(Continued)

OTHER PUBLICATIONS

EPO; Application No. 19215208.0; Extended European Search Report dated May 14, 2020.

*Primary Examiner* — Andrew Joseph Rudy
(74) *Attorney, Agent, or Firm* — Fitch, Even, Tabin & Flannery LLP

(57) ABSTRACT

An order registration device includes: a processor configured to execute a process that includes: a number-of-people registration process for registering the number of customers related to one transaction; a product registration process for registering a product ordered by the customers; and a display control process for performing control such that a display unit displays a number-of-people button which is a button for inputting the number of orders with respect to the product registered in the product registration process, the same number as the number of customers registered in the number-of-people registration process being set as the number of orders by the number-of-people button.

13 Claims, 19 Drawing Sheets

(56) References Cited

U.S. PATENT DOCUMENTS

2013/0151357 A1\* 6/2013 Havas .................... G06Q 50/12
705/15
2017/0308818 A1\* 10/2017 Almishari .............. G06Q 30/04

FOREIGN PATENT DOCUMENTS

| JP | 2011-118937 A | 6/2011 |
| JP | 2013-137840 A | 7/2013 |

\* cited by examiner

FIG. 5

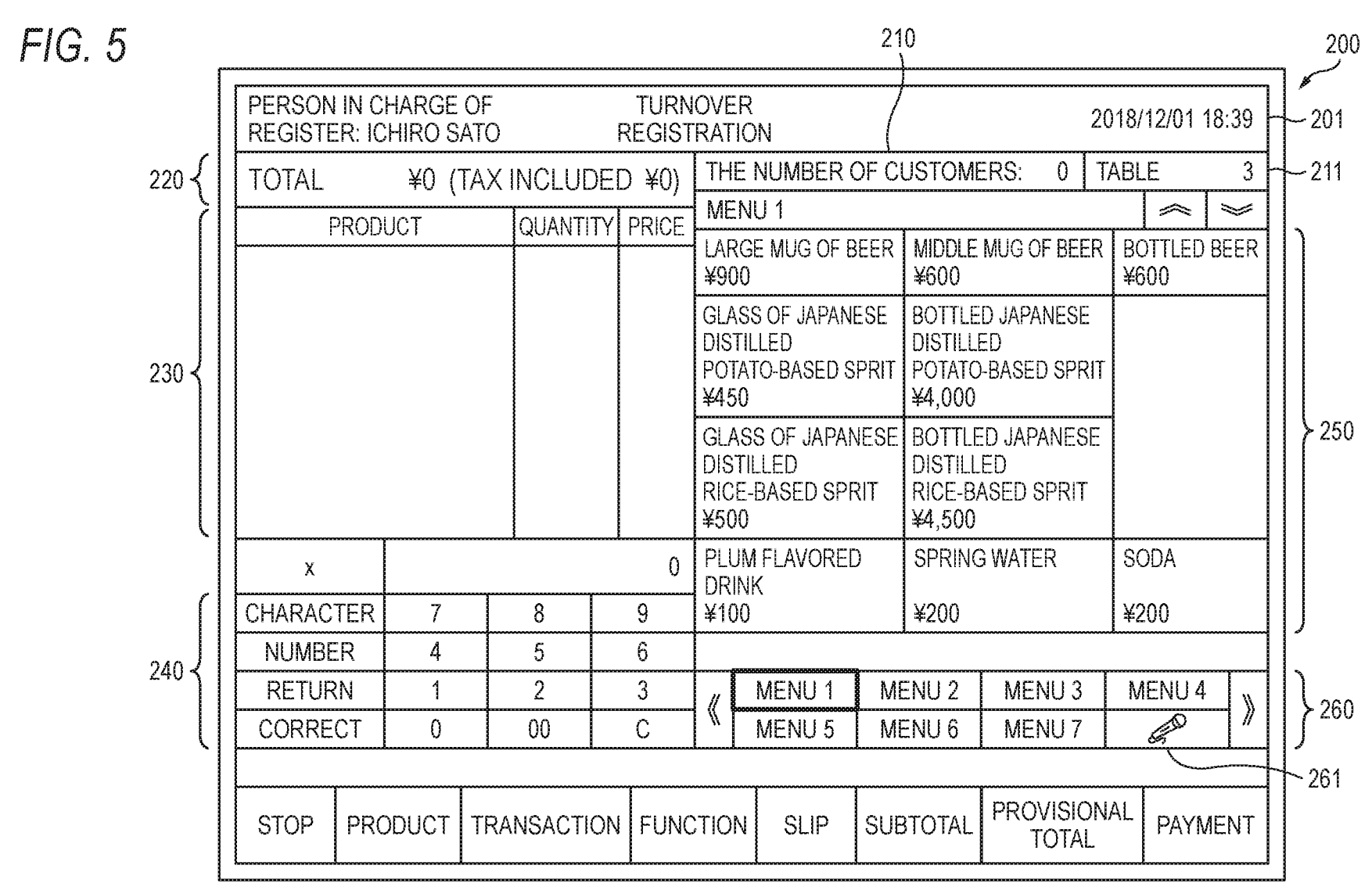

| PERSON IN CHARGE OF REGISTER: ICHIRO SATO | | | TURNOVER REGISTRATION | | 2018/12/01 18:39 |
|---|---|---|---|---|---|
| TOTAL ¥0 (TAX INCLUDED ¥0) | | | THE NUMBER OF CUSTOMERS: 0 | TABLE 3 | ≪ ≫ |

MENU 1

| PRODUCT | QUANTITY | PRICE | LARGE MUG OF BEER ¥900 | MIDDLE MUG OF BEER ¥600 | BOTTLED BEER ¥600 |
|---|---|---|---|---|---|
| | | | GLASS OF JAPANESE DISTILLED POTATO-BASED SPRIT ¥450 | BOTTLED JAPANESE DISTILLED POTATO-BASED SPRIT ¥4,000 | |
| | | | GLASS OF JAPANESE DISTILLED RICE-BASED SPRIT ¥500 | BOTTLED JAPANESE DISTILLED RICE-BASED SPRIT ¥4,500 | |
| | | | PLUM FLAVORED DRINK ¥100 | SPRING WATER ¥200 | SODA ¥200 |
| | | 0 | ≪ | MENU 1 | MENU 2 | MENU 3 | MENU 4 |
| × | 7 | 8 | 9 | | | |
| CHARACTER | 4 | 5 | 6 | MENU 5 | MENU 6 | MENU 7 | ≫ |
| NUMBER | 1 | 2 | 3 | | | |
| RETURN | 0 | 00 | C | | | |
| CORRECT | | | | | | |

| STOP | PRODUCT | TRANSACTION | FUNCTION | SLIP | SUBTOTAL | PROVISIONAL TOTAL | PAYMENT |

| PERSON IN CHARGE OF REGISTER: ICHIRO SATO | | | TURNOVER REGISTRATION | | 2018/12/01 18:39 | |
|---|---|---|---|---|---|---|
| TOTAL ¥0 (TAX INCLUDED ¥0) | | | THE NUMBER OF CUSTOMERS: ■ | | TABLE 3 | |
| | | | | | ≪ | ≫ |

| PRODUCT | QUANTITY | PRICE |
|---|---|---|
| | | |

MENU 1

| LARGE MUG OF BEER ¥900 | MIDDLE MUG OF BEER ¥600 | BOTTLED BEER ¥600 |
|---|---|---|
| GLASS OF JAPANESE DISTILLED POTATO-BASED SPRIT ¥450 | BOTTLED JAPANESE DISTILLED POTATO-BASED SPRIT ¥4,000 | |
| GLASS OF JAPANESE DISTILLED RICE-BASED SPRIT ¥500 | BOTTLED JAPANESE DISTILLED RICE-BASED SPRIT ¥4,500 | |
| PLUM FLAVORED DRINK ¥100 | SPRING WATER ¥200 | SODA ¥200 |

| | 7 | 8 | 9 | 0 |
|---|---|---|---|---|
| × | 4 | 5 | 6 | |
| CHARACTER | 1 | 2 | 3 | |
| NUMBER | 0 | 00 | C | |
| RETURN | | | | |
| CORRECT | | | | |

| ≪ | MENU 1 | MENU 2 | MENU 3 | MENU 4 |
|---|---|---|---|---|
| | MENU 5 | MENU 6 | MENU 7 | ✎ ≫ |

| STOP | PRODUCT | TRANSACTION | FUNCTION | SLIP | SUBTOTAL | PROVISIONAL TOTAL | PAYMENT |
|---|---|---|---|---|---|---|---|

FIG. 7

| PERSON IN CHARGE OF REGISTER: ICHIRO SATO | | | TURNOVER REGISTRATION | | 2018/12/01 18:39 | |
|---|---|---|---|---|---|---|
| TOTAL ¥0 (TAX INCLUDED ¥0) | | | THE NUMBER OF CUSTOMERS: 8 | | TABLE 3 | |
| | | | MENU 1 | | ≪ | ≫ |
| PRODUCT | QUANTITY | PRICE | LARGE MUG OF BEER ¥900 | MIDDLE MUG OF BEER ¥600 | BOTTLED BEER ¥600 | |
| | | | GLASS OF JAPANESE DISTILLED POTATO-BASED SPRIT ¥450 | BOTTLED JAPANESE DISTILLED POTATO-BASED SPRIT ¥4,000 | | |
| | | | GLASS OF JAPANESE DISTILLED RICE-BASED SPRIT ¥500 | BOTTLED JAPANESE DISTILLED RICE-BASED SPRIT ¥4,500 | | |
| | | | PLUM FLAVORED DRINK ¥100 | SPRING WATER ¥200 | SODA ¥200 | |
| x | | 0 | ≪ | MENU 1 | MENU 3 | MENU 4 |
| CHARACTER | 7 | 8 | 9 | MENU 5 | MENU 7 | ≫ |
| NUMBER | 4 | 5 | 6 | MENU 2 | | |
| RETURN | 1 | 2 | 3 | MENU 6 | | |
| CORRECT | 0 | 00 | C | | | |
| STOP | PRODUCT | TRANSACTION | FUNCTION | SLIP | SUBTOTAL | PROVISIONAL TOTAL | PAYMENT |

FIG. 8

| PERSON IN CHARGE OF REGISTER: ICHIRO SATO | | | TURNOVER REGISTRATION | | 2018/12/01 18:39 |
|---|---|---|---|---|---|
| TOTAL ¥900 (TAX INCLUDED ¥67) | | | THE NUMBER OF CUSTOMERS: 8 | TABLE | 3 |

MENU 1  《  》

| PRODUCT | QUANTITY | PRICE |
|---|---|---|
| LARGE MUG OF BEER | 1 | 900 |

| LARGE MUG OF BEER ¥900 | MIDDLE MUG OF BEER ¥600 | | BOTTLED BEER ¥600 |
|---|---|---|---|
| GLASS OF JAPANESE DISTILLED POTATO-BASED SPRIT ¥450 | BOTTLED JAPANESE DISTILLED POTATO-BASED SPRIT ¥4,000 | | |
| GLASS OF JAPANESE DISTILLED RICE-BASED SPRIT ¥500 | BOTTLED JAPANESE DISTILLED RICE-BASED SPRIT ¥4,500 | | |
| PLUM FLAVORED DRINK ¥100 | SPRING WATER ¥200 | | SODA ¥200 |

| | | | | |
|---|---|---|---|---|
| × | | | | 0 |
| CHARACTER | 7 | 8 | 9 | |
| NUMBER | 4 | 5 | 6 | |
| RETURN | 1 | 2 | 3 | |
| CORRECT | 0 | 00 | C | |

《 | MENU 1 | MENU 2 | MENU 3 | MENU 4 》
   | MENU 5 | MENU 6 | MENU 7 | ✎

| STOP | PRODUCT | TRANSACTION | FUNCTION | SLIP | SUBTOTAL | PROVISIONAL TOTAL | PAYMENT |

| PERSON IN CHARGE OF REGISTER: ICHIRO SATO | | | TURNOVER REGISTRATION | | 2018/12/01 18:39 |
|---|---|---|---|---|---|
| TOTAL ¥7,200 (TAX INCLUDED ¥533) | | | THE NUMBER OF CUSTOMERS: 8 | TABLE | 3 |

| PRODUCT | QUANTITY | PRICE |
|---|---|---|
| LARGE MUG OF BEER | 8 | 7,200 |

MENU 1  《  》

| LARGE MUG OF BEER ¥900 | MIDDLE MUG OF BEER ¥600 | BOTTLED BEER ¥600 |
|---|---|---|
| GLASS OF JAPANESE DISTILLED POTATO-BASED SPRIT ¥450 | BOTTLED JAPANESE DISTILLED POTATO-BASED SPRIT ¥4,000 | |
| GLASS OF JAPANESE DISTILLED RICE-BASED SPRIT ¥500 | BOTTLED JAPANESE DISTILLED RICE-BASED SPRIT ¥4,500 | |
| PLUM FLAVORED DRINK ¥100 | SPRING WATER ¥200 | SODA ¥200 |

| × | 7 | 8 | 9 | 0 |
|---|---|---|---|---|
| CHARACTER | 4 | 5 | 6 | |
| NUMBER | 1 | 2 | 3 | |
| RETURN | 0 | 00 | C | |
| CORRECT | | | | |

| 《 | MENU 1 | MENU 2 | MENU 3 | MENU 4 | 》 |
| | MENU 5 | MENU 6 | MENU 7 | ✎ | |

| STOP | PRODUCT | TRANSACTION | FUNCTION | SLIP | SUBTOTAL | PROVISIONAL TOTAL | PAYMENT |

FIG. 11A

| | | | QUANTITY | |
|---|---|---|---|---|
| | | | | 1 |
| 7 | 8 | 9 | THE NUMBER OF PEOPLE | |
| 4 | 5 | 6 | | |
| 1 | 2 | 3 | + | |
| 0 | | C | − | |
| CANCEL | | | OK | |

| | | | QUANTITY | |
|---|---|---|---|---|
| | | | | 1 |
| 7 | 8 | 9 | THE NUMBER OF PEOPLE | |
| 4 | 5 | 6 | | |
| 1 | 2 | 3 | + | |
| 0 | | C | − | |
| CANCEL | | | OK | |

| | QUANTITY | |
|---|---|---|
| | | 1 |
| 7 | THE NUMBER OF PEOPLE | 9 |
| 4 | 5 | 6 |
| 1 | 2 | 3 |
| 0 | | C |
| CANCEL | | OK |

| PERSON IN CHARGE OF REGISTER: ICHIRO SATO | | TURNOVER REGISTRATION | | 2018/12/01 18:39 | | |
|---|---|---|---|---|---|---|
| TOTAL ¥900 (TAX INCLUDED ¥67) | | THE NUMBER OF CUSTOMERS: 8 | | TABLE | « | 3 » |
| PRODUCT | QUANTITY | PRICE | MENU 1 | | | |
| LARGE MUG OF BEER | 1 | 900 | LARGE MUG OF BEER ¥900 | MIDDLE MUG OF BEER ¥600 | BOTTLED BEER ¥600 | |
| | THE NUMBER OF PEOPLE | | GLASS OF JAPANESE DISTILLED POTATO-BASED SPRIT ¥450 | BOTTLED JAPANESE DISTILLED POTATO-BASED SPRIT ¥4,000 | | |
| | | | GLASS OF JAPANESE DISTILLED RICE-BASED SPRIT ¥500 | BOTTLED JAPANESE DISTILLED RICE-BASED SPRIT ¥4,500 | | |
| x | | 0 | PLUM FLAVORED DRINK ¥100 | SPRING WATER ¥200 | SODA ¥200 | |
| CHARACTER | 7 | 8 | 9 | « | MENU 1 | MENU 2 | MENU 3 | MENU 4 |
| NUMBER | 4 | 5 | 6 | MENU 5 | MENU 6 | MENU 7 | 🖊 |
| RETURN | 1 | 2 | 3 | | | | |
| CORRECT | 0 | 00 | C | | | | |
| STOP | PRODUCT | TRANSACTION | FUNCTION | SLIP | SUBTOTAL | PROVISIONAL TOTAL | PAYMENT |

FIG. 13

| PERSON IN CHARGE OF REGISTER: ICHIRO SATO | | TURNOVER REGISTRATION | | 2018/12/01 18:39 | | 200B / 201 / 211 |
|---|---|---|---|---|---|---|

200B 201 211

| TOTAL ¥7,200 (TAX INCLUDED ¥533) | | THE NUMBER OF CUSTOMERS: 8 | TABLE 3 | « | » |
|---|---|---|---|---|---|

220 ─

| PRODUCT | QUANTITY | PRICE |
|---|---|---|
| LARGE MUG OF BEER | 1 | 900 |
| | 2 | |
| | 3 | |
| | 4 | |
| | 5 | |
| | 6 | |
| | 7 | |

MENU 1

| LARGE MUG OF BEER ¥900 | MIDDLE MUG OF BEER ¥600 | BOTTLED BEER ¥600 |
|---|---|---|
| GLASS OF JAPANESE DISTILLED POTATO-BASED SPRIT ¥450 | BOTTLED JAPANESE DISTILLED POTATO-BASED SPRIT ¥4,000 | |
| GLASS OF JAPANESE DISTILLED RICE-BASED SPRIT ¥500 | BOTTLED JAPANESE DISTILLED RICE-BASED SPRIT ¥4,500 | |
| PLUM FLAVORED DRINK ¥100 | SPRING WATER ¥200 | SODA ¥200 |

250

230 ─

| | × | THE NUMBER OF PEOPLE ▷ | 0 |
|---|---|---|---|
| CHARACTER | 7 | 8 | 9 |
| NUMBER | 4 | 5 | 6 |
| RETURN | 1 | 2 | 3 |
| CORRECT | 0 | 00 | C |

232

240 ─

| « | MENU 1 | MENU 2 | MENU 3 | MENU 4 |
|---|---|---|---|---|
| | MENU 5 | MENU 6 | MENU 7 | ✎ |

260 / 261

233

| STOP | PRODUCT | TRANSACTION | FUNCTION | SLIP | SUBTOTAL | PROVISIONAL TOTAL | PAYMENT |
|---|---|---|---|---|---|---|---|

FIG. 14

| | 2018/12/01 18:39 | | | | | | |
|---|---|---|---|---|---|---|---|
| TURNOVER REGISTRATION | THE NUMBER OF PRODUCTS: | 0 | | | | | |
| | TOTAL | ¥0 | | | | | |
| | TAX INCLUDED | ¥0 | | | | | |
| | TABLE | 3 | | | | | |
| | THE NUMBER OF CUSTOMERS: | 8 | | | | | |
| | PERSON IN CHARGE | ICHIRO SATO | | | | | |

| | | 2018/12/01 18:39 | |
|---|---|---|---|
| TURNOVER REGISTRATION | THE NUMBER OF PRODUCTS: | | 0 |
| | TOTAL | | ¥0 |
| | TAX INCLUDED | | ¥0 |
| | | | |
| | TABLE | | 3 |
| | THE NUMBER OF CUSTOMERS: | | 8 |
| | PERSON IN CHARGE | | ICHIRO SATO |

| LARGE MUG OF BEER | ¥900 |
| MIDDLE MUG OF BEER | ¥600 |
| BOTTLED BEER | ¥600 |
| GLASS OF JAPANESE DISTILLED POTATO-BASED SPRIT | ¥450 |
| BOTTLED JAPANESE DISTILLED POTATO-BASED SPRIT | ¥4,000 |
| GLASS OF JAPANESE DISTILLED RICE-BASED SPRIT | ¥500 |
| BOTTLED JAPANESE DISTILLED RICE-BASED SPRIT | ¥4,500 |

MENU 1  MENU 2

FIG. 16

TURNOVER REGISTRATION — 2018/12/01 18:39 — 301

| | | |
|---|---|---|
| THE NUMBER OF PRODUCTS: | 1 | — 321 |
| TOTAL | ¥900 | — 322 |
| TAX INCLUDED | ¥67 | — 323 |
| TABLE | 3 | — 324 |
| THE NUMBER OF CUSTOMERS: | 8 | — 325 |
| PERSON IN CHARGE | ICHIRO SATO | — 326 |

300B

341 — LARGE MUG OF BEER
QUANTITY: 1    ¥900

351 — [+]
352 — [−]
353 — THE NUMBER OF PEOPLE

| | | 2018/12/01 18:39 | |
|---|---|---|---|
| | THE NUMBER OF PRODUCTS: | 1 | |
| | TOTAL | ¥900 | |
| | TAX INCLUDED | ¥67 | |
| LARGE MUG OF BEER QUANTITY: 1  [+] [−] [THE NUMBER OF PEOPLE] [THE NUMBER OF ADULTS] [THE NUMBER OF CHILDREN] ¥900  TURNOVER REGISTRATION | | | |
| | TABLE | 3 | |
| | THE NUMBER OF CUSTOMERS: | 8 | |
| | THE NUMBER OF ADULTS: | 4 | |
| | THE NUMBER OF CHILDREN: | 4 | |
| | PERSON IN CHARGE | ICHIRO SATO | |

FIG. 20

| PERSON IN CHARGE OF REGISTER: ICHIRO SATO | | RESERVATION INFORMATION | 2018/12/01 17:56 |
|---|---|---|---|
| ▼ 2018/12/01 ▲ | | | |
| 18:00 | TARO SUZUKI | 8 PEOPLE NON-SMOKING | JAPANESE HOT POT CUISINE, UNLIMITED DRINKS |
| 18:00 | HANAKO TANAKA | 4 PEOPLE SMOKING | |
| 18:30 | JIRO SAITO | 2 PEOPLE PRIVATE ROOM | |
| 18:30 | MATSUKO ITO | 18 PEOPLE NON-SMOKING | FEMALE PARTY COURSE |

ORDER REGISTRATION DEVICE, ORDER REGISTRATION METHOD, AND RECORDING MEDIUM

CROSS-REFERENCE TO RELATED APPLICATIONS

This application is based on and claims priority under 35 USC 119 from Japanese Patent Application No. 2018-235888 filed on Dec. 17, 2018, the contents of which are incorporated herein by reference.

TECHNICAL FIELD

The present invention relates to an order registration device, an order registration method, and a recording medium.

BACKGROUND ART

When registering orders of customers in an order registration device (an electronic register or an OES (Order Entry System) terminal), the user (a clerk) registers the numbers of customers, table numbers, products, and quantities (the numbers of products and the numbers of orders). For example, in Japanese Patent Application Laid-Open No. 2013-137840, a technology for registering the number of customers as initial information on customers is disclosed.

As procedures of registering ordered products and quantities, a procedure of tapping a button corresponding to a product and registering the quantity using numeric keys, a procedure of tapping a button corresponding to a product and increasing and decreasing the quantity by tapping a plus button (a "+" button) and a minus button (a "−" button), and a procedure of tapping a button corresponding to a product and repeatedly tapping the product button the same number of times as the quantity are general.

In restaurants, it is often to make the same number of orders as the number of people for a drink, an appetizer, or the like. In this case, according to the technology of the related art, it is required to check the number of customers, and input the number using the numeric keys or input the number by repeatedly tapping a button. Therefore, a possibility of mistaking the number of customers and registering the wrong quantity (the wrong number of orders) occurs. Also, repeatedly tapping a product button or a plus button the same number of times as the number of customers is a tiresome operation, and makes customers wait, so a problem that the service quality is degraded occurs.

SUMMARY OF INVENTION

An order registration device related to one aspect includes: a processor configured to execute a process that includes: a number-of-people registration process for registering the number of customers related to one transaction; a product registration process for registering a product ordered by the customers; and a display control process for performing control such that a display unit displays a number-of-people button which is a button for inputting the number of orders with respect to the product registered in the product registration process, the same number as the number of customers registered in the number-of-people registration process being set as the number of orders by the number-of-people button.

BRIEF DESCRIPTION OF DRAWINGS

FIG. 5 is a view illustrating an initial screen of a turnover registration screen of the electronic register according to the embodiment;

FIG. 6 is a view illustrating a screen of the electronic register according to the embodiment when receiving the number of customers;

FIG. 7 is a view illustrating a screen of the electronic register according to the embodiment after registration of the number of customers;

FIG. 8 is a view illustrating a screen of the electronic register according to the embodiment after order registration;

FIG. 9 is a view illustrating a screen of the electronic register according to the embodiment in which a numeric keypad is displayed;

FIG. 10 is a view illustrating a screen of the electronic register according to the embodiment after selecting a number-of-people button;

FIG. 11A is a view illustrating numeric keypads according to a first modification of the embodiment;

FIG. 11B is a view illustrating numeric keypads according to the first modification of the embodiment;

FIG. 11C is a view illustrating numeric keypads according to the first modification of the embodiment;

FIG. 12 is a view illustrating a turnover registration screen according to a second modification of the embodiment;

FIG. 13 is a view illustrating a turnover registration screen according to a third modification of the embodiment;

FIG. 14 is a view illustrating a turnover registration screen according to a fourth modification of the embodiment;

FIG. 15 is a view illustrating a turnover registration screen according to the fourth modification of the embodiment in which a product menu is displayed;

FIG. 16 is a view illustrating a turnover registration screen according to the fourth modification of the embodiment after product selection;

FIG. 18 is a view illustrating a turnover registration screen according to a sixth modification of the embodiment;

FIG. 20 is a view illustrating the screen configuration of a reservation information screen according to the seventh modification of the embodiment.

DESCRIPTION OF EMBODIMENTS

«Overall Configuration of Electronic Register»

Hereinafter, an electronic register (a turnover data processing device) will be described as an order registration device according to a mode for carrying out the present invention (an embodiment). The electronic register according to the present embodiment is characterized by including a number-of-people button such that a user can order the same number of products as the number of customers by tapping the number-of-people button. Also, the embodiment of the present invention is not limited to the electronic register, and may be an OES terminal (an order registration device or an order registration terminal).

The electronic register or the OES terminal is not limited to a dedicated device. It may be a smart phone or a computer such as a tablet terminal having a program installed therein for executing an order registration process (see FIG. 4) to be described below. Also, although a clerk is assumed as the user, a customer may operate the electronic register.

Figure 1:
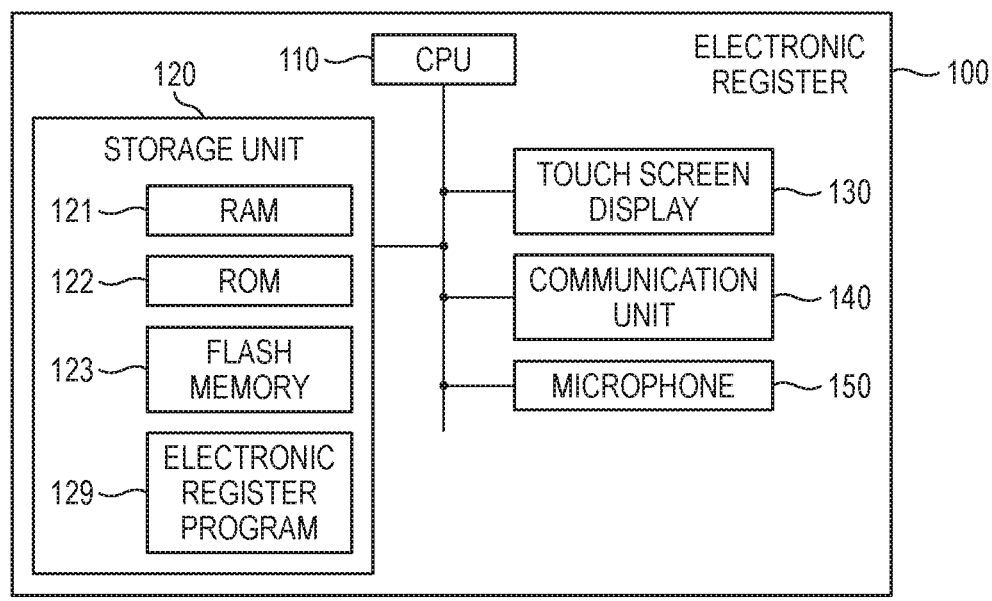
FIG. 1 is a functional block diagram illustrating the overall configuration of an electronic register according to an embodiment.

FIG. 1 is a functional block diagram illustrating the overall configuration of an electronic register 100 according to the embodiment. The electronic register 100 is configured to include a CPU (Central Processing Unit) 110 as a processor, a storage unit 120, a touch screen display 130, a communication unit 140, and a microphone 150.

The CPU 110 executes an electronic register program 129 which is stored in the storage unit 120, thereby executing the order registration process shown in FIG. 4 to be described below.

The storage unit 120 is configured to include a RAM (Random Access Memory) 121, a ROM (Read Only Memory) 122, and a flash memory 123, and stores data required for the electronic register program 129 to execute the order registration process and data required to execute the order registration process.

The touch screen display 130 displays a turnover registration screen (see FIG. 5 to be described below), and receives user's operations.

The communication unit 140 transmits and receives communication data to and from a computer different from the electronic register 100.

To the microphone 150, voice of the user which instructs (orders) operations can be input.

Figure 2:
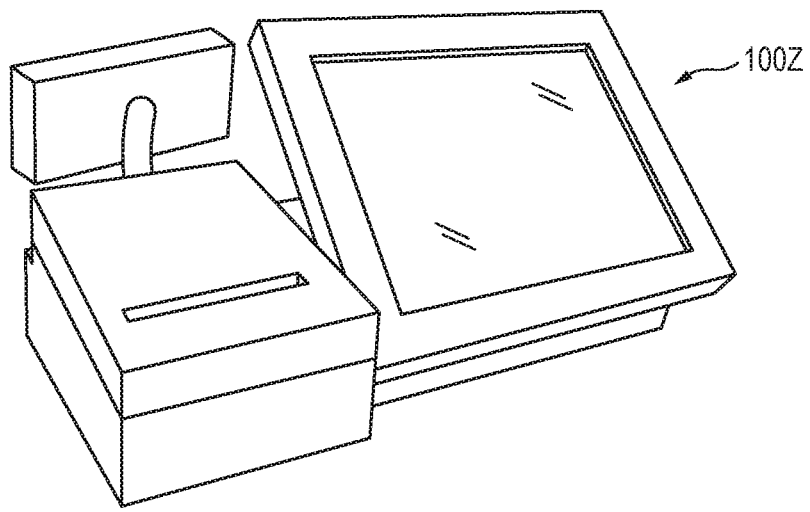
FIG. 2 is a view illustrating the external appearance of a stationary electronic register according to the embodiment.

FIG. 2 is a view illustrating the external appearance of a stationary electronic register 100Z according to the present embodiment. The electronic register 100 is not limited to a portable device such as a smart phone or a tablet terminal, and may be a stationary device as shown in FIG. 2.

«Order Registration Procedure»

Figure 3:
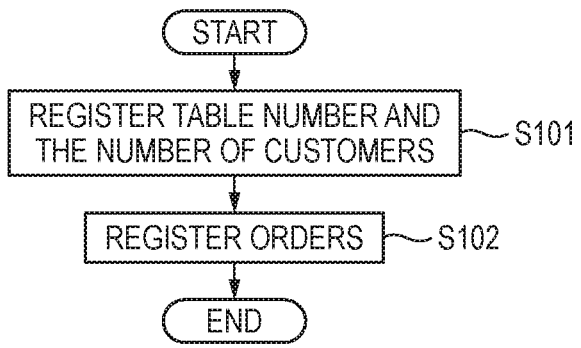
FIG. 3 is a flow chart illustrating an order registration procedure according to the embodiment which a user performs on the electronic register.

FIG. 3 is a flow chart illustrating an order registration procedure (a turnover registration procedure, a product registration procedure) according to the present embodiment which the user performs on the electronic register 100.

In STEP S101, the user registers a table number and the number of customers.

In STEP S102, the user registers orders. When registering the orders, the user registers an ordered product, and subsequently registers the quantity (the number of orders and the number of products).

Registration of the number of customers and orders will be described below in detail with reference to FIG. 4 to FIG. 10 to be described below.

«Processes of Electronic Register»

Figure 4:
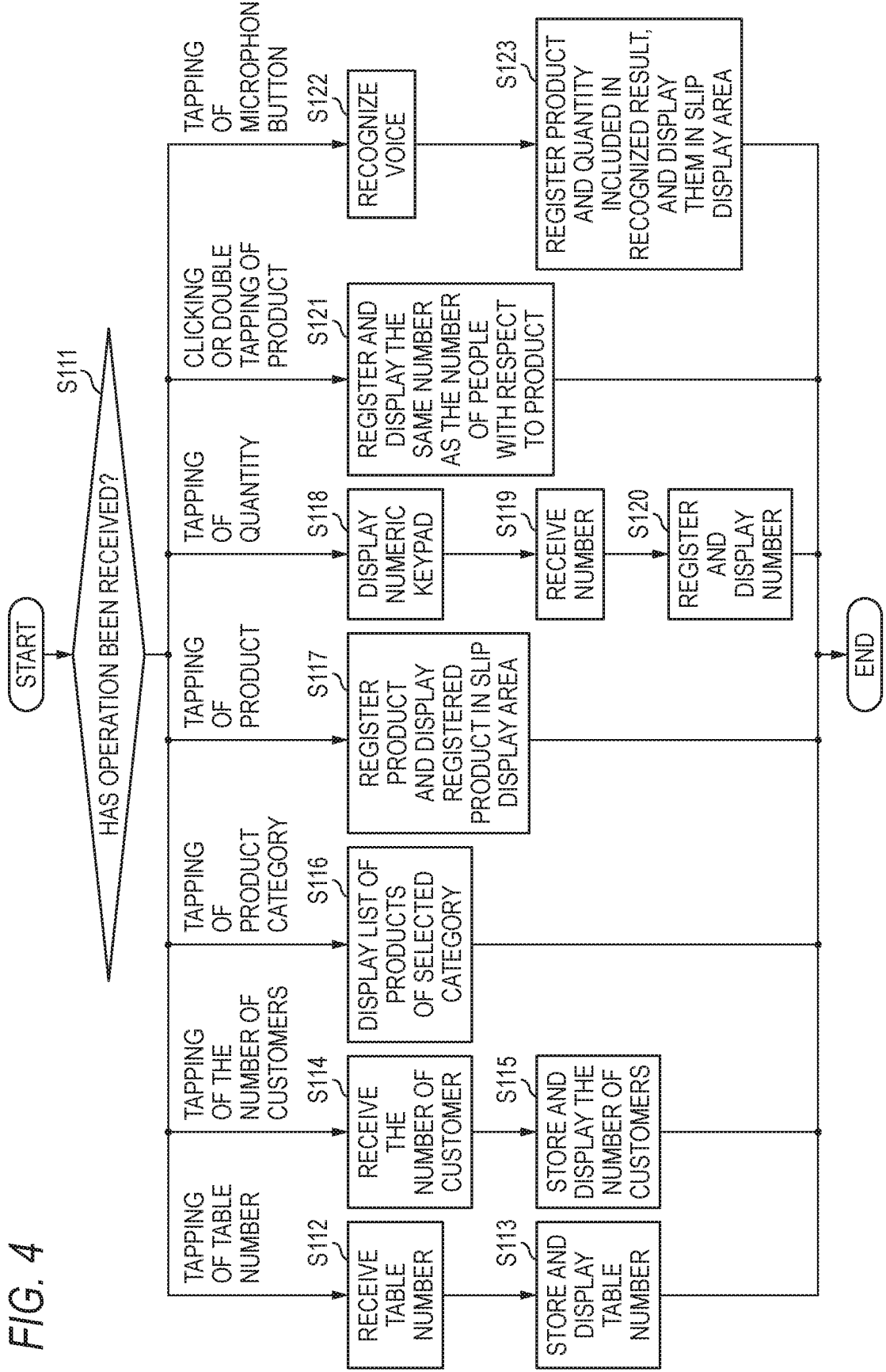
FIG. 4 is the flow chart of a process for registering the number of customers and orders which the electronic register according to the embodiment performs.

FIG. 4 is the flow chart of the process for registering the number of customers and orders which the electronic register 100 according to the embodiment performs. With reference to FIG. 4, and screens of the electronic register 100 shown in FIG. 5 to FIG. 10, a table number registration process, a number-of-customers registration process, and an order registration process (a turnover registration process and a product registration process) for a restaurant will be described.

«Turnover Registration Screen»

FIG. 5 is a view illustrating an initial screen of a turnover registration screen (an order registration screen) 200 of the electronic register 100 according to the present embodiment. With reference to FIG. 5, the screen configuration of the turnover registration screen 200 will be described.

In the upper part of the turnover registration screen 200, a title display area 201 is disposed. In the title display area 201, the name of the user of the electronic register 100, the screen title, and date and time are displayed.

In a number-of-customers display area 210, the number of customers is displayed.

In a table number display area 211, the identification information (table number) of a table where customers are sitting is displayed.

In a total price display area 220, the total price of products ordered and registered are displayed.

In a slip display area 230, the list of the names, quantities, and prices of registered products are displayed.

Numeric keys 240 are buttons for inputting numbers.

A product display area 250 is an area where the list of products is displayed and buttons for registering individual products as orders are disposed. In FIG. 5, "MENU1" included in a product category display area 260 (to be described below) has been selected, and in the product display area 250, the list of products belonging to "MENU1" is displayed. If a product button in the product display area 250 is tapped, the tapped product is registered and 1 is registered as the quantity, and they are displayed in the slip display area 230.

In the product category display area 260, product category buttons are disposed as a list of product categories (classes). If the user taps a button of a category including an ordered product, in the product display area 250, products included in the tapped category are displayed.

A microphone button 261 is a button for instructing start of order registration using voice input. If the microphone button 261 is tapped, it becomes possible to register orders by voice input from the microphone 150.

«Process for Registering Table Number and the Number of Customers»

Referring to FIG. 4 again, in STEP S111, the CPU 110 receives a user's operation. According to the received operation, the CPU proceeds to STEP S112, S114, S116, S117, S118, S121, or S122.

Specifically, if the operation received in STEP S111 is an operation of tapping the table number display area 211 (tapping of a table number in STEP S111), the CPU 110 proceeds to STEP S112.

If the operation received in STEP S111 is an operation of tapping the number-of-customers display area 210 (tapping of the number of customers in STEP S111), the CPU 110 proceeds to STEP S114.

If the operation received in STEP S111 is an operation of tapping the button of one of "MENU1" to "MENU7" (tapping of a product category in STEP S111), the CPU 110 proceeds to STEP S116.

If the operation received in STEP S111 is an operation of tapping a button in the product display area 250 (tapping of a product in STEP S111), the CPU 110 proceeds to STEP S117.

If the operation received in STEP S111 is an operation of tapping the product quantity displayed in the slip display area 230 (tapping of the quantity in STEP S111), the CPU 110 proceeds to STEP S118.

If the operation received in STEP S111 is an operation of clicking or double tapping a button in the product display area 250 (clicking or double tapping of a product in STEP S111), the CPU 110 proceeds to STEP S121.

If the operation received in STEP S111 is an operation of tapping the microphone button 261 in the product category display area 260 (tapping of the microphone button in STEP S111), the CPU 110 proceeds to STEP S122.

In STEP S112, the CPU 110 receives a table number. Specifically, if the table number display area 211 is tapped, and a numeric button which is one of the numeric keys 240 and corresponds to a table number, and a "RETURN" button are tapped, the CPU 110 detects this, and receives the table number.

In STEP S113, the CPU 110 stores the inputted table number in the storage unit 120, and displays the inputted table number in the table number display area 211.

In STEP S114, the CPU 110 receives the number of customers.

FIG. 6 is a view illustrating a screen of the electronic register 100 according to the present embodiment when receiving the number of customers. If the user taps the number-of-customers display area 210, a cursor 212 is displayed. The user inputs the number of customers using the numeric keys 240, and taps the "RETURN" button. Hereinafter, a description will be continued on the assumption that the number of customers is 8 and the user has tapped the "8" button and the "RETURN" button.

Referring to FIG. 4 again, in STEP S115, the CPU 110 stores the number of customers inputted, in the storage unit 120, and displays the number of customers in the number-of-customers display area 210. In other words, the CPU 110 executes a number-of-people registration process for registering the number of customers related to one transaction. Also, the CPU 110 serves as a number-of-people registration means for registering the number of customers related to one transaction.

FIG. 7 is a view illustrating a screen of the electronic register 100 according to the present embodiment after registration of the number of customers. In the number-of-customers display area 210, 8 is displayed as the number of customers.

«Order Registration Process: Product Selection Process»

Referring to FIG. 4 again, in STEP S116, the CPU 110 displays products belonging to a product category selected by tapping one of "MENU1" to "MENU7", in the product display area 250. In FIG. 7, "MENU1" has been selected, and products which are alcohol drinks such as "LARGE MUG OF BEER" and "MIDDLE MUG OF BEER" are displayed.

Referring to FIG. 4 again, in STEP S117, the CPU 110 registers a product selected by tapping, and registers 1 as the quantity (the number of orders), and displays them. In other words, the CPU 110 executes a product registration process for registering a product ordered by the customers. Also, the CPU 110 serves a product registration means for registering products ordered by customers.

FIG. 8 is a view illustrating a screen of the electronic register 100 according to the present embodiment after order registration. In the slip display area 230, "LARGE MUG OF BEER" which is the product tapped in the product display area 250 is registered and displayed with "1" which is the quantity and "900" which is the price. If a product is tapped in the product display area 250, 1 is registered as the quantity.

«Order Registration Process: Quantity Registration Process»

Referring to FIG. 4 again, in STEP S118, the CPU 110 displays a numeric keypad 270 (see FIG. 9 to be described below).

Figure 9:
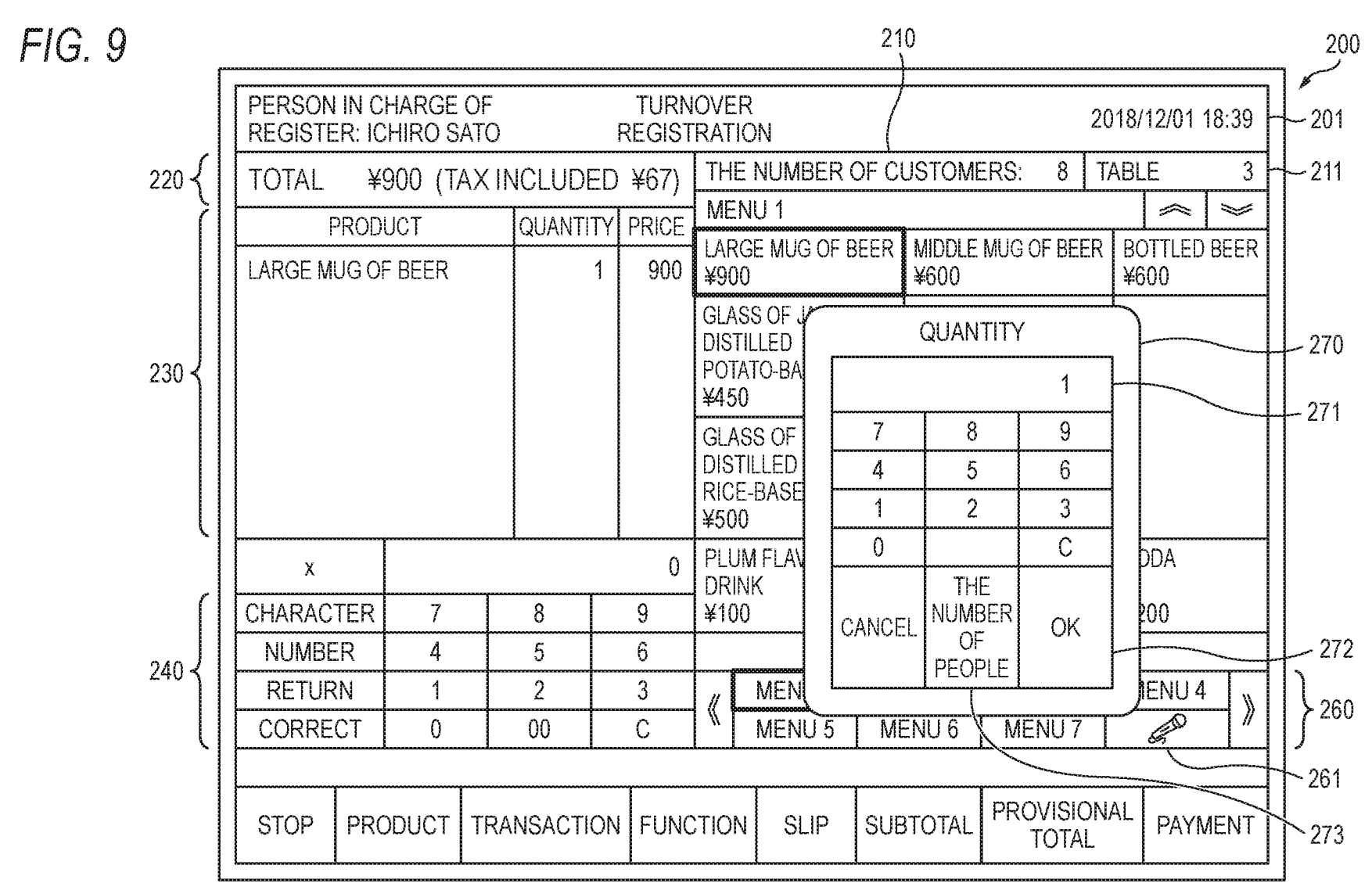

FIG. 9 is a view illustrating a screen of the electronic register 100 according to the present embodiment on which the numeric keypad 270 is displayed. If "1" displayed as the quantity of "LARGE MUG OF BEER" in the slip display area 230 is tapped, the CPU 110 displays the numeric keypad 270. The numeric keypad 270 includes an OK button 272 and a number-of-people button 273 besides a quantity display area 271 and numeric keys "0" to "9" (constant-number input buttons). In other words, the number-of-people button 273 is displayed alongside the numeric keys "0" to "9". In the quantity display area 271 shown in FIG. 9, "1" which is the current quantity is displayed.

Referring to FIG. 4 again, in STEP S119, the CPU 110 receives the quantity inputted from the numeric keypad 270.

For example, if the number of orders is 4, the user taps the "4" button and the OK button 272 of the numeric keypad 270. Also, if the number of orders is the same as the number of people (in FIG. 9, if the number of orders is the same as 8 which is the number of people shown in the number-of-customers display area 210), the user taps the number-of-people button 273 and the OK button 272. The CPU 110 receives the number or the same number as the number of people inputted, as the quantity, and closes the numeric keypad 270. However, if the number-of-people button 273 is tapped, the CPU 110 may receive the same number as the number of people without tapping of the OK button 272, and close the numeric keypad 270. In other words, the CPU 110 executes a display control process for controlling a display unit such that the display unit displays the number-of-people button for setting the same number as the number of customers registered by the number-of-people registration process as a predetermined number of orders for the product registered by the product registration process, as a button for inputting the predetermined number of orders. Also, the CPU 110 serves as a display control means for controlling the display unit such that the display unit displays the number-of-people button for setting the same number as the number of customers registered by the number-of-people registration means as the predetermined number of orders for the product registered by the product registration means., as a button for inputting the predetermined number of orders.

In STEP S120, the CPU 110 registers the number or the same number as the number of people received in STEP S119, as the number of orders, and displays the number of orders in the slip display area 230. In the case where the same number as the number of people is received, the CPU registers and displays the number of people shown in the number-of-customers display area 210 (see STEPS S114 and S115), as the number of orders. Hereinafter, a description will be continued on the assumption that the number-of-people button 273 and the OK button 272 have been tapped.

FIG. 10 is a view illustrating a screen of the electronic register 100 according to the present embodiment after selection of the number-of-people button 273. The quantity of "LARGE MUG OF BEER" displayed in the slip display area 230 changes to "8" which is the same number as the number of people.

«Order Registration Process: Clicking or Double Tapping of Product Button»

Referring to FIG. 4 again, in STEP S121, with respect to the product of the button clicked or double tapped, the CPU 110 registers the corresponding product and registers the same number of the number of people as the quantity, and displays them in the slip display area 230. For example, if the button "LARGE MUG OF BEER" in the screen of FIG. 7 is double tapped or clicked, "LARGE MUG OF BEER" and 8 which is the same number as the number of people are registered, and the screen transitions to the screen of FIG. 10.

«Order Registration Process: Voice Input»

In STEP S122, the CPU 110 acquires the ordered product and the quantity by recognizing the order voice inputted to the microphone 150.

In STEP S123, the CPU 110 registers the ordered product and the quantity included in the recognized result, and displays them in the slip display area 230. With respect to the quantity, in the case where the same number of orders as the number of people is recognized from the voice such as "the same number of orders as the number of people", "the number of orders for all the people", or "one for each person", the CPU 110 registers and displays the number of people shown in the number-of-customers display area 210, as the quantity. Also, in the case where "two for each person" is recognized, the CPU 110 registers the same number as twice the number of people.

«Features of Order Registration Process»

The numeric keypad 270 (see FIG. 9) for inputting a product quantity (the number of products or the number of orders) according to the present embodiment includes the number-of-people button 273. By using the number-of-people button 273, the user can input the same product quantity as the number of people by one touch operation. Since it becomes possible to input the product quantity by the number-of-people button 273, it is possible to reduce labor for counting and inputting the number of customers. Therefore, it is possible to avoid input errors attributable to counting errors and making customers wait during counting.

In inputting a quantity using the numeric keypad 270 (see FIG. 9), in order to input a number, the user taps the key of the number and the OK button 272. However, the same number as the number of people may be input by only tapping the number-of-people button 273, without tapping the OK button 272. Since this input procedure is received, when a number is inputted, the CPU 110 can receive the number after the user confirms the number, and when the same number as the number of people, the CPU can receive the number immediately after inputting.

«First Modification: Modification of Numeric Keypad»

FIG. 11A to FIG. 11C are views illustrating numeric keypads according to a first modification of the present embodiment. A numeric keypad 270A shown in FIG. 11A includes a plus button 274 and a minus button 275. If the plus button 274 is tapped, the quantity increases by one. If the minus button 275 is tapped, the quantity decreases by one.

Since the numeric keypad 270A includes the plus button 274 and the minus button 275, it becomes easy to input a quantity which is not the same quantity as the number of people but is before or after the same quantity as the number of people. For example, in the case where one of customers orders oolong tea and the others order large mugs of beer, when inputting the quantity of "LARGE MUG OF BEER", it is possible to input the quantity by tapping the number-of-people button 273 and tapping the minus button 275.

FIG. 11B is a view illustrating a numeric keypad 270B including a number-of-people button 273A (a blank button) grayed out. In the case where the numeric keypad 270B is displayed although the number of customers has not been registered, the CPU 110 may display the number-of-people button 273A grayed out, thereby making it unusable.

If seeing the number-of-people button 273A grayed out, the user can notice that the number of customers has not been registered. Especially, by the display information "SAME AS THE NUMBER OF PEOPLE" associated with the number-of-people button 273A and grayed out, it is clearly shown that if the number of customers is registered, the corresponding blank button is switched to the number-of-people button. If the user having noticed that the number of customers is unregistered registers the number of customers, in place of the numeric keypad 270B, the numeric keypad 270A including the normal number-of-people button 273 having not been grayed out is displayed such that the user can input the same product quantity as the number of people by tapping the number-of-people button 273.

FIG. 11C is a view illustrating a numeric keypad 270C including the number-of-people button 273 substituted for the key (button) of the same number as the number of customers. In the case where "8" has been registered as the number of customers, the CPU 110 disposes the number-of-people button 273 in place of the "8" button in the numeric keypad 270C. The user can input "8" which is the same number as the number of people, as the quantity, by tapping the number-of-people button 273.

«Second Modification: Number-of-people Button in Slip Display Area»

FIG. 12 is a view illustrating a turnover registration screen 200A according to a second modification of the present embodiment. In the second modification, a number-of-people button 231 is disposed close to the quantity in the slip display area 230. After a product is registered, if the number-of-people button 231 is tapped, the CPU 110 changes the quantity to the same number as the number of people.

«Third Modification: Dropdown List for Inputting Quantity»

FIG. 13 is a view illustrating a turnover registration screen 200B according to a third modification of the present embodiment. In the third modification, if the quantity in the slip display area 230 is tapped, a dropdown list 232 is displayed instead of the numeric keypad 270 or 270A. If a number or "THE NUMBER OF PEOPLE" included in the dropdown list 232 is tapped, the CPU 110 changes the quantity to the tapped number or the same number as the number of people. If a downward triangular button 233 is tapped, the CPU 110 displays the dropdown list 232 including numbers larger than the number of people, and receives an input.

«Fourth Modification: Turnover Registration Screen Having Different Screen Configuration»

FIG. 14 is a view illustrating a turnover registration screen 300 according to a fourth modification of the present embodiment. With reference to FIG. 15 and FIG. 16 besides FIG. 14, the screen configuration of the turnover registration screen 300 different from the turnover registration screen 200 of the present embodiment will be described.

In the upper part of the turnover registration screen 300, a title display area 301 is disposed. In the title display area 301, the screen title and date and time are displayed.

In a number-of-products display area 321, the quantities of products registered are displayed. In a total price display area 322, the total price of ordered products is displayed. In an included-tax display area 323, the tax is displayed.

In a table number display area 324, the identification information of a table where customers are sitting is displayed. In a number-of-customers display area 325, the number of customers is displayed. In a person-in-charge display area 326, the name of the user is displayed.

If the user taps a product display button 341, products are displayed.

FIG. 15 is a view illustrating a turnover registration screen 300A according to the fourth embodiment of the present embodiment where a product menu 342 is displayed. On the lower side of the product menu 342, a product category display area is disposed. In the product category display area shown in FIG. 15, a "MENU1" button and a "MENU2" button are displayed. If the user swipes the product category display area from side to side, other product category buttons are displayed.

In a part of the product menu 342 above the product category display area, a product display area is disposed, and a list of products is displayed. In FIG. 15, the "MENU1" button has been selected, and products belonging to "MENU1" are displayed. If the user swipes the product display area up and down, other products belonging to "MENU1" are displayed to be described below.

If a product button displayed in the product display area is tapped, 1 is registered as the quantity, and the corresponding product is displayed in a slip display area 350.

FIG. 16 is a view illustrating a turnover registration screen 300B according to the fourth modification of the present invention after product selection. In the slip display area 350, the list of the names, quantities, and prices of products registered is displayed. Near each quantity, a plus button 351, a minus button 352, and a number-of-people button 353 are disposed. If the plus button 351 is tapped, the quantity increases by 1. If the minus button 352 is tapped, the quantity decreases by 1. If the number-of-people button 353 is tapped, the same number as the number of people displayed in the number-of-customers display area 325 is registered and displayed.

«Fifth Modification: Registration of the Number of Customers Which is Performed in Parallel with Order Registration»

In the embodiment and the modifications described above, after the number of customers is registered, order registration is executed. Registration of the number of customers and order registration may be executed in parallel.

Figure 17:
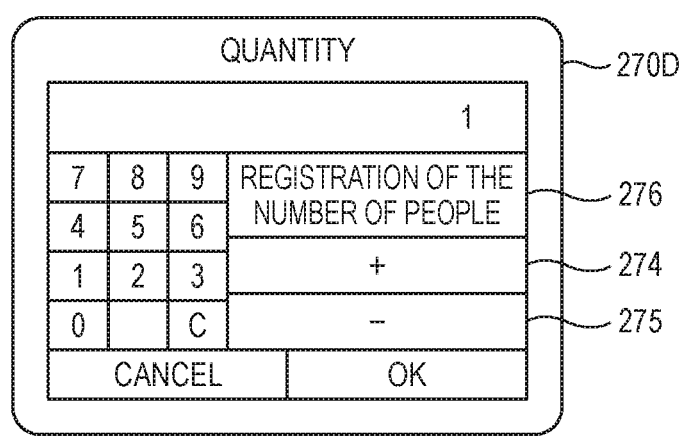
FIG. 17 is a view illustrating a numeric keypad according to a fifth modification of the embodiment.

FIG. 17 is a view illustrating a numeric keypad 270D according to a fifth modification of the present embodiment. Instead of the number-of-people button 273 (see FIG. 11A), a number-of-people registration button 276 is disposed. In the case where the numeric keypad 270D is displayed although the number of customers has not been registered, the CPU 110 disposes the number-of-people registration button 276 instead of the number-of-people button 273.

If the user taps the number-of-people registration button 276 when having inputted the same number as the number of customers, the CPU 110 registers the inputted number as the quantity and the number of customers, and displays the number-of-people button 273 instead of the number-of-people registration button 276. Also, the CPU 110 displays the number of customers in the number-of-customers display area 210. Thereafter, during quantity registration, instead of the numeric keypad 270D, the numeric keypad 270A is displayed.

In the case of noticing that the number of customers has not been registered when registering the quantity, the user can immediately register the number of customers using the number-of-people registration button 276.

If a number is inputted on the numeric keypad 270D and the number-of-people registration button 276 is tapped, the CPU 110 may register the inputted number as the quantity and the number of customers, and close the numeric keypad 270D. In this case, the user can perform the next input earlier «Sixth Modification: Number-of-Adults Button and Number-of-Children Button»

In the embodiment and the modifications described above, by tapping the number-of-people button, it is possible to register the same number as the number of customers as the quantity of a product. Separately from the same number as the number of customers, buttons for registering the same number as the number of adults or the number of children as the quantity of a product may be provided.

FIG. 18 is a view illustrating a turnover registration screen 300C according to a sixth modification of the present embodiment. As compared to the turnover registration screen 300B of FIG. 16, below the number-of-customers display area 325, an area 327 for displaying the number of adult customers and an area 328 for displaying the number of child customers are disposed. Also, on the right of the number-of-people button 353 of the slip display area 350, a number-of-adults button 354 (a number-of-people button) and a number-of-children button 355 (a number-of-people button) are disposed.

The user registers each of the number of adult customers and the number of child customers during registration of the number of customers. In the number-of-customers display area 325, the sum of the number of adult customers and the number of child customers is displayed. In the case where the same number of orders as the number of adults or the number of children have been received, the user can register the same number as the number of corresponding people by tapping the number-of-adults button 354 or the number-of-children button 355.

Since the electronic register has the number-of-adults button 354 and the number-of-children button 355, it is possible to reduce labor for counting and inputting the number of adults or children. Therefore, it is possible to avoid input errors attributable to counting errors and making customers wait during counting.

The electronic register may be configured such that the number of man customers and the number of woman customers can be registered instead of the number of adults and the number of children and the electronic register has a number-of-men button and a number-of-women button. The number-of-men button or the number-of-women button may be tapped such that the same number as the number of corresponding people is registered.

«Seventh Modification: Acquiring the Number of Customers Through Network»

In the embodiment and the modifications described above, the number of customers is registered in the main body of the electronic register 100. The number of customers may be acquired through a network.

Figure 19:
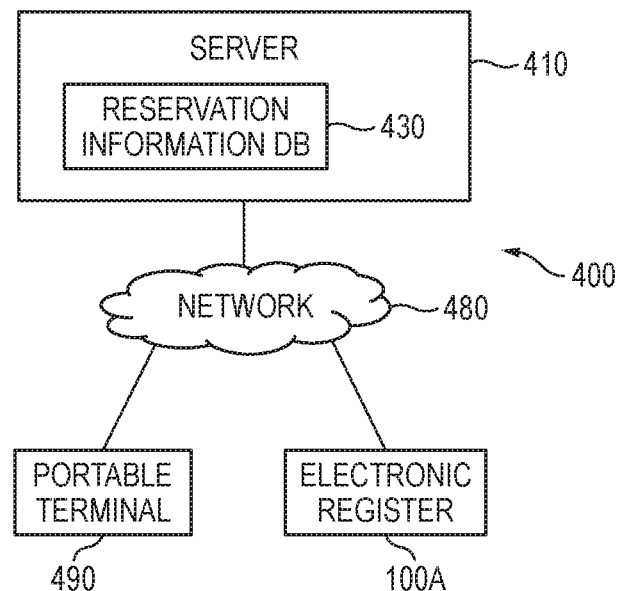
FIG. 19 is a view illustrating the overall configuration of an order registration system including an electronic register according to a seventh modification of the embodiment.

FIG. 19 is a view illustrating the overall configuration of an order registration system 400 including an electronic register 100A according to a seventh modification of the present embodiment. The order registration system 400 is configured to include a server 410 as a reservation management device, a portable terminal 490, and the electronic register 100A. The server 410, the portable terminal 490, and the electronic register 100A are connected by a network 480.

The server 410 accepts a visit reservation from the portable terminal 490 such as a smart phone which a customer uses, and stores information on the reservation in a reservation information database 430. The reservation information database 430 stores information such as the visit date and time, the customer name, the number of people, whether the customer wants the smoking section or the non-smoking section, a table, and cuisine. The configuration of the electronic register 100A is the same as that of the electronic register 100 (see FIG. 1), and acquires reservation information through the network 480.

FIG. 20 is a view illustrating the screen configuration of a reservation information screen 500 according to the seventh modification of the present embodiment. If reservation information display is instructed by the user, the CPU 110 acquires reservation information from the server 410, and displays the reservation information screen 500.

In the upper part of the reservation information screen 500, a title display area 501 is disposed. In the title display area 501, the name of the user of the electronic register 100A, the screen title, and date and time are displayed. In a reservation information display area 510, reservation information such as visit dates and times, customer names, the numbers of people, whether each customer wants the smoking section or the non-smoking section, and cuisine are displayed.

If a customer with a reservation visits the restaurant, the user of the electronic register 100A who is a clerk displays the reservation information screen 500, and taps the record on the customer. The CPU 110 registers the number of people included in the tapped record, as the number of customers, and displays the turnover registration screen 200 (see FIG. 5).

In the seventh modification, the user (the clerk) does not input the number of customers, but acquires reservation information, and acquires the number of customers from the number of people included in the reservation information. In this case, it is possible to reduce user's labor for counting the number of customers, and prevent erroneous inputs attributable to counting errors.

In the seventh modification, the server 410 is installed on the network, and accepts reservations. It is unnecessary to limit the present invention to the server 410 installed on the network, and a terminal for putting on the waiting list installed in the front of the restaurant may be used as a server. In this case, a customer registers the name and the number of people from the terminal, not from the portable terminal, in person, thereby getting on the waiting list.

«Eighth Modification: Acquiring the Number of Customers from Order Registration Contents»

In the seventh modification, the electronic register 100A acquires the number of customers from the reservation information or the waiting list information. The electronic register 100 may acquire the number of customers from order registration contents.

Figure 21:
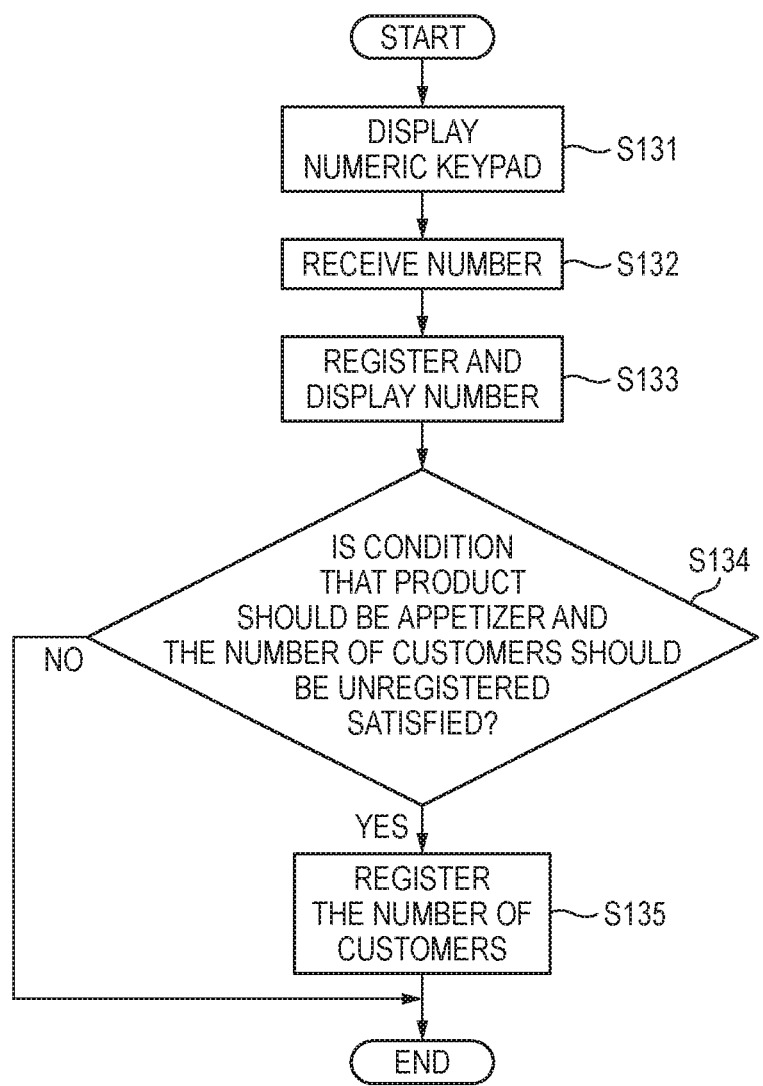
FIG. 21 is a flow chart illustrating a quantity registration process according to an eighth modification of the embodiment.

FIG. 21 is a flow chart illustrating a quantity registration process according to an eighth modification of the present embodiment. This process is a process which is an alternative to STEPS S118 to S120 (see FIG. 4).

STEPS S131 to S133 are processes identical to STEPS S118 to S120.

If it is determined in STEP S134 that the product for which the quantity has been registered in STEP S133 is an appetizer and the number of customers has not been registered ("Y" in STEP S134), the CPU 110 proceeds to STEP S135; whereas if the product is not an appetizer, or the number of customers has been registered ("N" in STEP S134), the CPU ends the process.

In STEP S135, the CPU 110 registers the number registered in STEP S133, as the number of customers. Also, the CPU 110 displays the number of customers in the number-of-customers display area 210.

In the present modification, even though the user forgets registration of the number of customers, with registration of a product such as an appetizer (a specific product) for which the same number of orders as the number of customers are made, the number of customers is registered. From the next order registration, the number-of-people button can be used. However, the product which causes registration of the number of customers is not limited to an appetizer, and may be another thing, like a drink such as tea or drinking water, or tableware such as a napkin, a glass, a set of a knife and a fork, which is registered in the electronic register 100 and with respect to which the same number of ones as the number of customers are set on the table.

«Ninth Modification: The Number of Table Seats»

In the seventh modification, the number of customers is acquired from the reservation information, and is registered, and in the eighth modification, the number of customers is acquired from the order registration contents, and is registered. The electronic register 100 may be configured to register the number of table seats as the quantity if the number-of-people button is tapped. Alternatively, the electronic register 100 may be configured to register the number of customers as the quantity if the number-of-people button is tapped when the number of customers has been registered, and register the number of table seats as the quantity if the number-of-people button is tapped when the number of customers has not been registered.

Also, the electronic register 100 may be configured to have a number-of-seats button instead of the number-of-people button. If the electronic register 100 retains the number of seats of each table, and the number-of-seats button is tapped, the same number as the number of seats of a registered table (see the table number display area 211 of FIG. 5) is registered. The electronic register 100 may include both of the number-of-people button and the number-of-seats button.

«Other Modifications»

The function dispersion form of the server side and the electronic register side in the order registration system shown in the present embodiment is not limited to the above-described form, and they can be functionally or physically dispersed or integrated into arbitrary units within such a range that it is possible to achieve the same effects and functions.

Also, in this specification, the steps describing the program include not only processes which are performed in the order of them in a time series, but also processes which are performed in parallel or individually.

Although some embodiments of the present invention have been described above, those embodiments are merely illustrative and do not limit the technical range of the present invention. The present invention can take other various embodiments, and various modifications such as omission and replacement can be made without departing the gist of the present invention. These embodiments and modifications are included in the scope and gist of the invention described in this specification and so on, and are included in the scope of the inventions disclosed in claims and their equivalents.

What is claimed is:

1. An order registration device comprising:
a processor configured to execute a process comprising:
a number-of-people registration process for registering a number of customers related to one transaction;
a product registration process for registering a product ordered by the customers; and a display control process for performing control such that a display unit displays numeric keys for inputting a number of orders for the product registered in the product registration process, wherein
in the display control process, when the number of customers has been registered in the number-of-people registration process at a timing of registering an ordered product in the product registration process, the processor is configured to display a number-of-people button for inputting, as the number of orders, a same number as the number of customers registered in the number-of-people registration process in addition to the numeric keys.

2. The order registration device according to claim 1, wherein
in the display control process, when the number of customers has not been registered in the number-of-people registration process, the processor is configured to perform control such that the display unit displays an inoperable blank button, and
in the display control process, when the number of customers has been registered in the number-of-people registration process, the processor is configured to perform control such that the display unit displays the number-of-people button in place of the blank button.

3. The order registration device according to claim 2, wherein
in the display control process, the processor is configured to perform control such that the display unit displays information in association with the blank button, the information clearly showing that the blank button is switched to the number-of-people button when the number of customers is registered by the number-of-people registration process.

4. The order registration device according to claim 1, wherein
in the display control process, when the number of customers has not been registered in the number-of-people registration process at the timing of registering the ordered product in the product registration process, the processor is configured to perform control such that the display unit displays a number-of-people registration button for registering the number of customers in the number-of-people registration process in addition to the numeric keys, and
in the display control process, when the number of customers has been registered in the number-of-people registration process, the processor is configured to perform control such that the display unit displays the number-of-people button in place of the number-of-people registration button.

5. The order registration device according to claim 1, wherein
in the display control process, the processor is configured to switch on and off of display of the number-of-people button based on whether the number of customers has been registered or not in the number-of-people registration process.

6. The order registration device according to claim 1, wherein
in the number-of-people registration process, the processor is configured to classify the customers related to the one transaction into at least two groups and register the number of customers belonging to each group; and
in the display control process, the processor is configured to perform control such that the display unit displays the number-of-people button related to each group.

7. The order registration device according to claim 1, wherein
in the number-of-people registration process, the processor is configured to acquire the number of customers from a reservation management device storing reservation information including identification information of the customers and the number of customers, and is configured to register the number of customers.

8. The order registration device according to claim 1, wherein
in the number-of-people registration process, when a specific product has been registered in the product registration process, the processor is configured to register the number of orders for the specific product, as the number of customers.

9. The order registration device according to claim 1, wherein
in the display control process, the processor is configured to perform control such that the display unit displays the number of customers inputted in the number-of-people registration process.

10. The order registration device according to claim 1, wherein
in the display control process, the processor is configured to perform control such that a touch screen display displays the number-of-people button.

11. The order registration device according to claim 1, wherein
in the number-of-people registration process, the processor is configured to store the number-of-customers in a predetermined memory, and
in the display control process, the processor is configured to display the number-of-people button with reference to the number of customers stored in the predetermined memory.

12. A non-transitory computer-readable recording medium storing a program executable by a processor of an order registration device, wherein
the program causes the processor to execute a process comprising:
a number-of-people registration process for registering a number of customers related to one transaction;
a product registration process for registering a product ordered by the customers; and
a display control process for performing control such that a display unit displays numeric keys for inputting a number of orders for the product registered in the product registration process, wherein
in the display control process, when the number of customers has been registered in the number-of-people registration process at a timing of registering an ordered product in the product registration process, the processor is configured to display a number-of-people button for inputting, as the number of orders, a same number as the number of customers registered in the number-of-people registration process in addition to the numeric keys.

13. An order registration method comprising:
a number-of-people registration step for registering a number of customers related to one transaction;
a product registration step for registering a product ordered by the customers; and
a display control step for performing control such that a display unit displays numeric keys for inputting a number of orders for the product registered in the product registration step, wherein the display control step comprises displaying, when the number of customers has been registered in the number-of-people registration step at a timing of registering an ordered product in the product registration step, a number-of-people button for inputting, as the number of orders, a same number as the number of customers registered in the number-of-people registration step in addition to the numeric keys.

\* \* \* \* \*